(12) United States Patent
Berlemont

(10) Patent No.: US 11,004,171 B2
(45) Date of Patent: May 11, 2021

(54) MULTIMODAL VIEWER

(71) Applicant: KEEN EYE TECHNOLOGIES, Paris (FR)

(72) Inventor: Sylvain Berlemont, Paris (FR)

(73) Assignee: KEEN EYE TECHNOLOGIES, Paris (FR)

( * ) Notice: Subject to any disclaimer, the term of this patent is extended or adjusted under 35 U.S.C. 154(b) by 141 days.

(21) Appl. No.: 16/314,494

(22) PCT Filed: Jun. 30, 2016

(86) PCT No.: PCT/IB2016/001120
§ 371 (c)(1),
(2) Date: Dec. 31, 2018

(87) PCT Pub. No.: WO2018/002684
PCT Pub. Date: Jan. 4, 2018

(65) Prior Publication Data
US 2019/0156453 A1    May 23, 2019

(51) Int. Cl.
*G06T 1/60* (2006.01)
*G06T 1/20* (2006.01)
*G06T 3/00* (2006.01)

(52) U.S. Cl.
CPC ............... *G06T 1/60* (2013.01); *G06T 1/20* (2013.01); *G06T 3/00* (2013.01)

(58) Field of Classification Search
None
See application file for complete search history.

(56) References Cited

U.S. PATENT DOCUMENTS

| | | | |
|---|---|---|---|
| 5,973,628 A * | 10/1999 | McDonnell | H03M 9/00 341/67 |
| 6,707,458 B1 * | 3/2004 | Leather | G06T 15/04 345/582 |
| 7,768,516 B1 * | 8/2010 | Bourdev | G06T 1/20 345/501 |
| 10,740,865 B2 * | 8/2020 | Lee | G06T 1/20 |
| 2005/0207488 A1 * | 9/2005 | Ouyang | H04N 19/61 375/240.2 |

(Continued)

OTHER PUBLICATIONS

Perpeet et al., "Engineering the ideal gigapixel image viewer," Advanced Maui Optical and Space Surveillance Technologies Conference. 2011.

(Continued)

*Primary Examiner* — Kevin Ky
(74) *Attorney, Agent, or Firm* — Maier & Maier, PLLC

(57) ABSTRACT

Disclosed is a multi-channel image processing method including the steps of: storing a multi-channel image in one or several 2D texture units each formed of a pack of four tiles in a server; taking a selection of one or several channels of the multi-channel image into account; taking transformation and projection parameters (real-time user input) for the selected channels into account; applying the transformation on the selected channels, according to received parameters, all pixels of the selected channels being processed at the same time; projecting the selected channels into an RGB color space, according to the received parameters, all pixels of the selected channels being processed at the same time.

8 Claims, 9 Drawing Sheets

(56) References Cited

U.S. PATENT DOCUMENTS

| | | | | |
|---|---|---|---|---|
| 2005/0213661 | A1* | 9/2005 | Xiang | H04N 19/43 375/240.16 |
| 2011/0038556 | A1* | 2/2011 | Mathe | H04N 19/61 382/245 |
| 2016/0379333 | A1* | 12/2016 | Krutsch | G06T 15/04 345/506 |
| 2018/0365794 | A1* | 12/2018 | Lee | G06N 3/0481 |

OTHER PUBLICATIONS

Cohen et al., "Real-Time high-dynamic range texture mapping." Rendering techniques 2001. Springer, Vienna, 2001. 313-320.
Preliminary Search Report for French Patent Application No. FR 1656262 dated Jun. 30, 2016.

* cited by examiner

Sequential algorithm (Central Processing Unit)
Inputs:
    $M$ (Projection matrix $m \times 3$)
    $ThLs$ (Vector of $m$ values)
    $ThHs$ (Vector of $m$ values)
    $Channels$ (Vector of $m$ channels)
Outputs:
    $Out$ (Matrix of Vectors of three components representing the R, G and B values)
Instructions:
for each pixel $p$ do
    $Out\,[1][p] = 0; Out\,[2][p] = 0; Out\,[3][p] = 0;$
    for $i = 1$ to $m$ do
        $x = Channels\,[i][p];$
        if $x < ThLs\,[i]$ then
          $x = 0;$
        else if $x > ThHs\,[i]$ then
          $x = max;$
        else
$$x = \frac{max}{(ThHs\,[i] - ThLs\,[i])}\,(x - ThLs\,[i]);$$
        end if
        for $j = 1$ to 3 do
          $Out\,[j][p] = M[i][j].x;$
        end for
    end for
    display $Out\,[j][p]$ at pixel $p$
end for

FIG. 8

Parallel algorithm (Graphics Processing Unit)

Inputs:
- $M$ (Projection matrix $m \times 3$)
- $ThLs$ (Vector of $m$ values)
- $ThHs$ (Vector of $m$ values)
- $T$ (vector of K texture units (RGBA))

Outputs:
- $Out$ (Matrix of Vectors of three components representing the R, G and B values)

Instructions:

for all pixels $p$ do   //parallel execution of the following program $Out[1][p] = 0; Out[2][p] = 0; Out[3][p] = 0;$
    $offset = 0;$
    for $k = 1$ to $K$ do
        $x[offset + 1]$ = value of $p$ in R;
        $x[offset + 2]$ = value of $p$ in G;
        $x[offset + 3]$ = value of $p$ in B;
        $x[offset + 4]$ = value of $p$ in A;
        Offset += 4;
    end for
    for $i = 1$ to $m$ do
        if $x[i] > ThLs[i]$ then
            if $x[i] > ThHs[i]$ then
                $x[i] = max;$
            else
$$x = \frac{max}{(ThHs[i] - ThLs[i])}(x[i] - ThLs[i]);$$
            end if
        end if
        $Out[1][p] = M[i][1].x[i]$
        $Out[2][p] = M[i][2].x[i]$
        $Out[3][p] = M[i][3].x[i]$
    end for

Display Out values at pixels

FIG. 9

MULTIMODAL VIEWER

FIELD OF THE INVENTION

The present invention relates to an image communication system and method, and more particularly to a multi-channel image high speed viewing and manipulating method.

BACKGROUND OF THE INVENTION

Imaging systems are becoming more and more sophisticated, capturing enormous amount of data at an increasingly high speed and resolution. The key challenge for a successful image analysis is to view, manipulate, analyze and share image data in a reliable, easy and timely manner.

One issue of a multi-channel image analysis is to have the possibility to display a wanted selection of channels and to process transformations (ex. contrast adjustment, color change . . . ) on each channel separately. Another issue is to allow collaborative interpretation of the results by giving to professionals the possibility to access to the displayed data simultaneously, wherever they are and from any communication device such as a computer, a tablet or a smartphone.

The invention is related to a complete framework to process a multi-channel image stored in a server. The framework is accessible from any web browser, without any required plugin installation. The method for processing a multi-channel image, according to the present invention, must work on resource limited devices such as mobile devices.

SUMMARY OF THE INVENTION

The invention relates to a method for processing a multi-channel image very quickly allowing the users to access simultaneously to the data, from any communication device.

The method comprises a storing method, to transform the multi-channel image in several 2D texture units. This step is precomputed in a server.

The framework providing the processing method is accessible by a multiplicity of users from any communication devices such as a computer, a tablet or a smartphone. For example, when one user chooses a multi-channel image stored in the server, and input a selection of channels, the related channels are displayed in all the connected communication devices.

In general, for a considered multi-channel image, any of the users—but one at a time—can choose a selection of channels, transformation and projection parameters for each channel, at any time. The transformation and projection steps are processed in the selected channels, at very high speed thanks to parallel computing i.e. all the pixels of all the selected channels are processed at the same time in the graphics processing units of the connected devices.

The invention can be applied in any multi-channel image, such as two-dimension, three-dimension, 8-bit data form or 16-bit data form. The different channels of the image can be from different imaging modalities.

It is proposed a method for viewing and manipulating a multi-channel image composed of several channels, whose channels originate from one or several imaging modalities, this method comprising the steps of:
  storing a multi-channel image in one or several 2D texture units, each representing a pack of four 8-bit tiles corresponding to one or several channels at a given location in the multi-channel image, each 2D texture unit being a fixed size memory storage unit in one graphics processing unit,
  taking a selection of one or several channels of the multi-channel image into account,
  taking transformation and projection parameters for the selected channels into account,
  applying the transformation on the selected channels, according to received parameters, all pixels of the selected channels being transformed at the same time,
  projecting the selected channels into an RGB color space, according to the received parameters, all pixels of the selected channels being projected at the same time.

The applied transformation can be for example a modification of the image's contrast determined by the input parameters.

The storing step, conducted for an 8-bit data type image, comprises the operations of:
  splitting each channel of the multi-channel image into a regular grid of 8-bit tiles of the same size, and of the same size as a 2D texture unit,
  grouping the 8-bit tiles corresponding to a given location in the regular grid into one or several 2D texture units.

When it is conducted for a 16-bit data type image, this storing step comprises the operations of:
  splitting each channel of the multi-channel image into a regular grid of 16-bit tiles of the same size, and of the same size as a 2D texture unit,
  splitting each 16-bit tile into a couple of two 8-bit tiles by separating the eight highest bits from the eight lowest bits for each 16-bit pixel value,
  grouping the 8-bit tiles corresponding to a given location in the regular grid into one or several 2D texture units.

The transformation step, conducted for an 8-bit data type image, comprises the operations of:
  attributing channel intensity values to pixels from the values stored in 2D texture units channels,
  computing new pixel values according to input transformation parameters.

The projecting step, conducted for an 8-bit data type image, comprises the operation of computing the linear projection of all pixels into an RGB color space, according to input projection parameters.

In the case of a 16-bit data type image, this projecting step comprises the operations of:
  computing the linear projection of all pixels into an RGB color space using input projection parameters,
  converting each obtained channels R, G and B into 8-bit channels.

The transformation step, conducted for a 16-bit data type image, comprises the operations of:
  converting each consecutive couple of 8-bit 2D texture units channels into 16-bit values,
  attributing channel intensity values to pixels from the 16-bit values,
  computing new pixel values according to input transformation parameters.

The present invention also provides a system, for processing a multi-channel image, the multi-channel image composed of several channels, said system comprising a server including:
  a conversion module for converting multi-channel images into one or several 2D texture units, each representing a pack of four 8-bit tiles corresponding to one or several channels at a given location in the multi-channel image, each 2D texture unit being a fixed size memory storage unit in one Graphics Processing Unit, a memory module for storing the obtained 2D texture units, a connection module for connecting one or several communication devices, such as a personal computer, a digital tablet or a smartphone, to a same account, a selection module for receiving the selection of one or several channels of a multi-channel image stored in the server, from any of the communication devices connected to the server at a same account, a setting module for receiving input transformation or projection parameters for the selected channels from any of the communication devices connected to the server at a same account, a processing module for instructing the devices connected to the server at a same account, to process—according to the received parameters—a transformation and a projection of the selected channels, into an RGB color space, directly in their Graphics Processing Units.

BRIEF DESCRIPTION OF THE DRAWINGS

The above and further objects and advantages of the invention will become apparent from the detailed description of preferred embodiments, considered in conjunction with the accompanying drawings.

FIG. 8 is an example of a sequential implementation of transformation and projection steps.

FIG. 9 is an example of a parallel implementation of transformation and projection steps.

DETAILED DESCRIPTION

Figure 1:
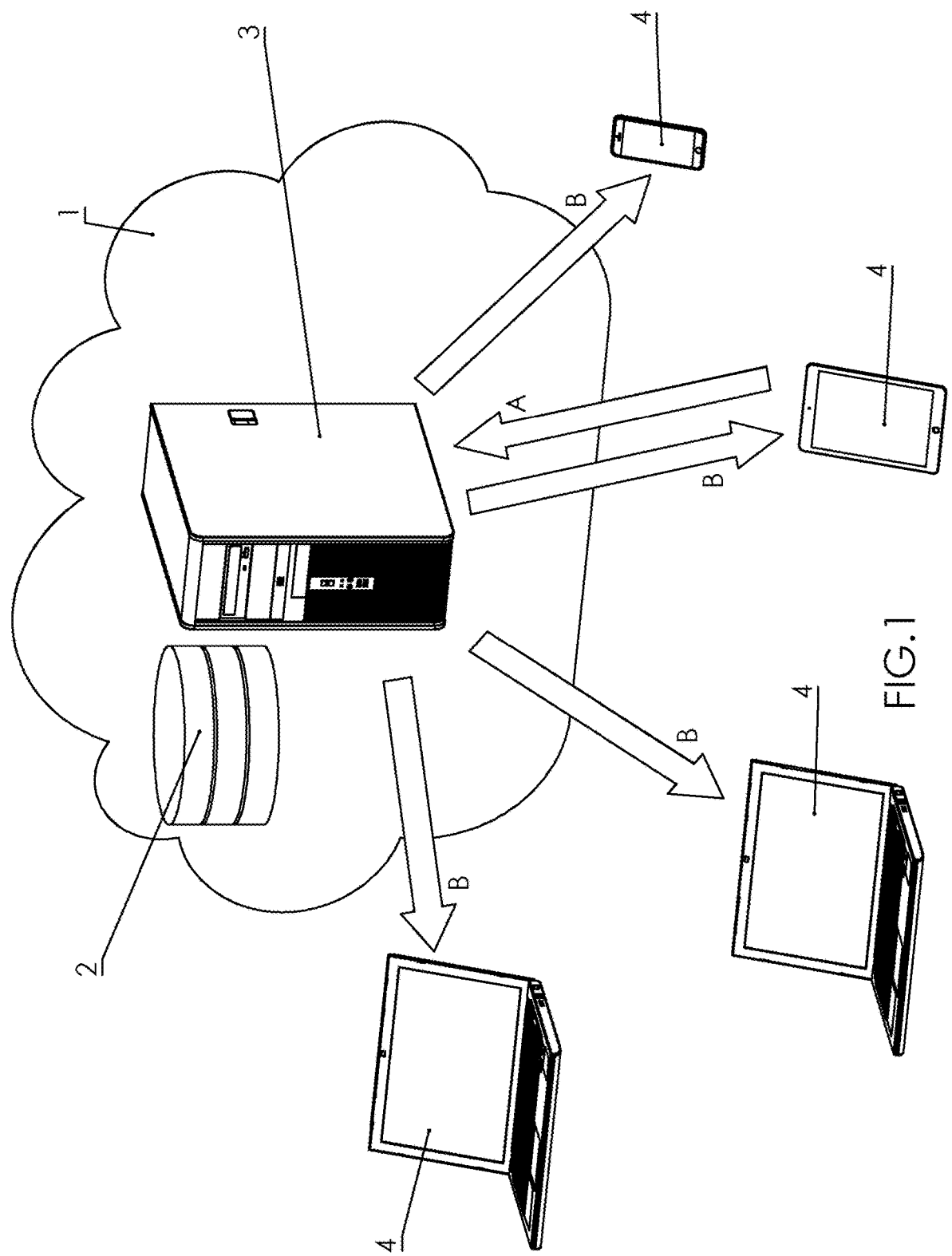
FIG. 1 is an illustration of the global communication system.

FIG. 1 represents the global communication system. It comprises a server 1 with a memory unit 2 and a central processing unit 3. The memory unit 2 stores multi-channel images in 2D texture units. The step of transforming a multi-channel image in several 2D texture units is performed by the central processing unit 3 of the server 1.

Several users, regardless to their number, are connected to the server 1 thanks to a framework accessible from any web browser, and from any communication devices 4 such as a smartphone, a tablet or a computer, as illustrated in FIG. 1. When one of the users sends parameters to the server 1 (arrow A), this one commands the connected communication devices 4 to compute the processing steps in their Graphics Processing Units (arrows B). Any of the users can enter new parameters.

The high speed of the processing method related to this invention, allows a group of users to visualize simultaneously the same data, and the modifications processed in real-time. In the present description, the expression of real-time refers to an operation whose execution time lasts less than 40 milliseconds.

The modifications that users can perform on the multi-channel image are:
a selection of one or several channels to be displayed on devices' screen,
the transformation parameters of each channel,
the projection parameters of each channel.

Figure 2:
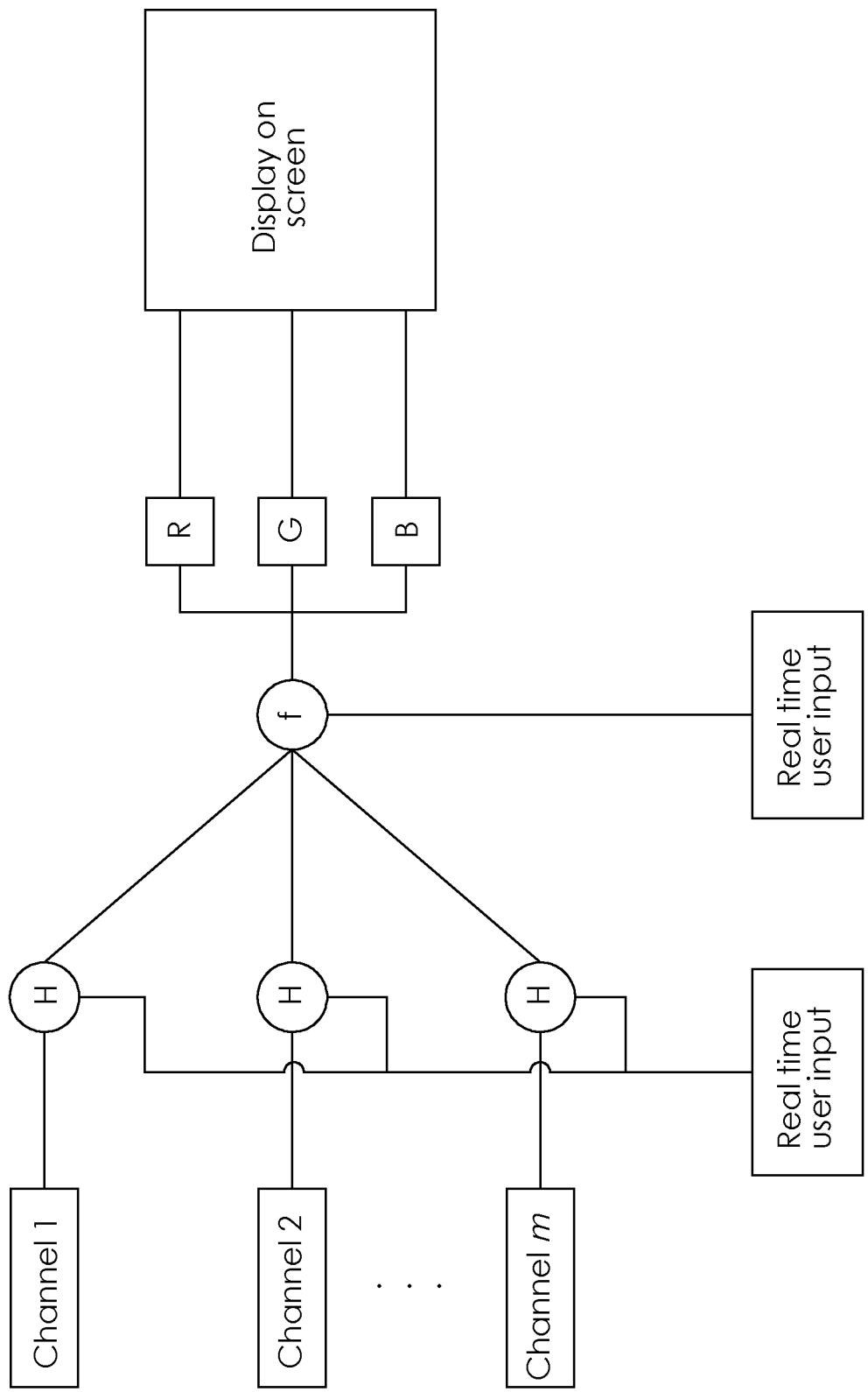
FIG. 2 represents a functional diagram of the transformation and projection to an RGB color space for an example of an 8-bit data type image.
Figure 3:
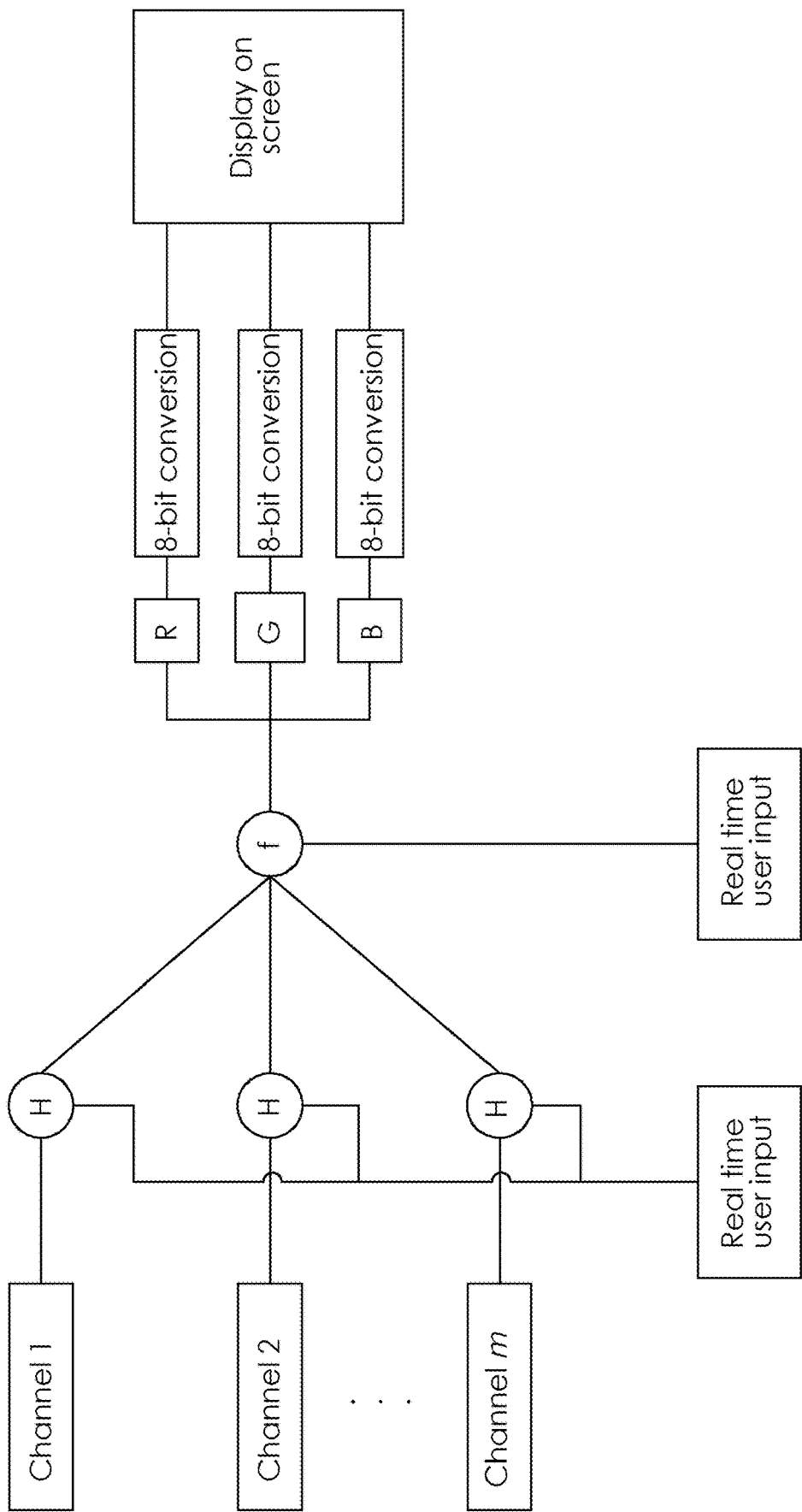
FIG. 3 represents a functional diagram of the transformation and projection to an RGB color space for an example of a 16-bit data type image.

The transformation and projection steps are performed in the graphics processing unit of each connected device. FIG. 2 is a functional diagram of the transformation and projection steps in the case of an 8-bit data type image example. For comparison, FIG. 3 illustrates these steps for a 16-bit data type image. For a 16-bit data type image, there is a supplementary step of conversion of the data into an 8-bit data type.

The steps illustrated in FIG. 2 and FIG. 3 are the transformation and the projection steps. The transformation operation called H in FIG. 2 and FIG. 3 has two input data for each channel. The transformation operation H can be for example a contrast adjustment operation. The following description will sometimes use the particular case of a contrast adjustment, but this invention is not limited to this type of transformation. Any type of transformation involving modification of pixel values can be applied (ex. deblurring, segmentation . . . ).

A contrast adjustment operation can be mathematically expressed as:

given x an input value in [0.255] or [0, $2^{16}-1$], and considering two parameters ThL and ThH, $$x: \to \left\{ \begin{array}{c} 0 \text{ if } x < ThL \\ \max \text{ if } x > ThH \\ \frac{\max}{ThH - ThL}(x - ThL) \text{ otherwise} \end{array} \right\}$$

In the case of 8-bit data type image, the value of max is equal to 255, and in the case of 16-bit data type image, the value of max is equal to $2^{16}-1$.

The projection operation f in FIG. 2 and FIG. 3 is a linear projection of the channel images into an RGB color space. It is defined by a matrix M whose values are adjusted by a user. The matrix M contains as much lines as input channels and three columns.

The projection and transformation steps are made in real-time, which allows users to process modifications and visualize them simultaneously.

The input channels of the transformation step are of particular form. They are stored in the server 1 in 2D texture units. A 2D texture unit is a fixed size memory storage unit bind to a graphics processing units. A 2D texture unit, according to the present invention is a pack of four 8-bit tiles corresponding to one or several channels at a given location in the concerned multi-channel image.

Most of the time, a 2D texture unit is used to display an RGBA image i.e. the content of the 2D texture unit is directly displayed on screen. In the particular usage related to this invention, 2D texture units are used only for their memory storage functions to facilitate and improve the speed of the process. The H and f operations previously presented are executed directly in the 2D texture units.

Figure 4:
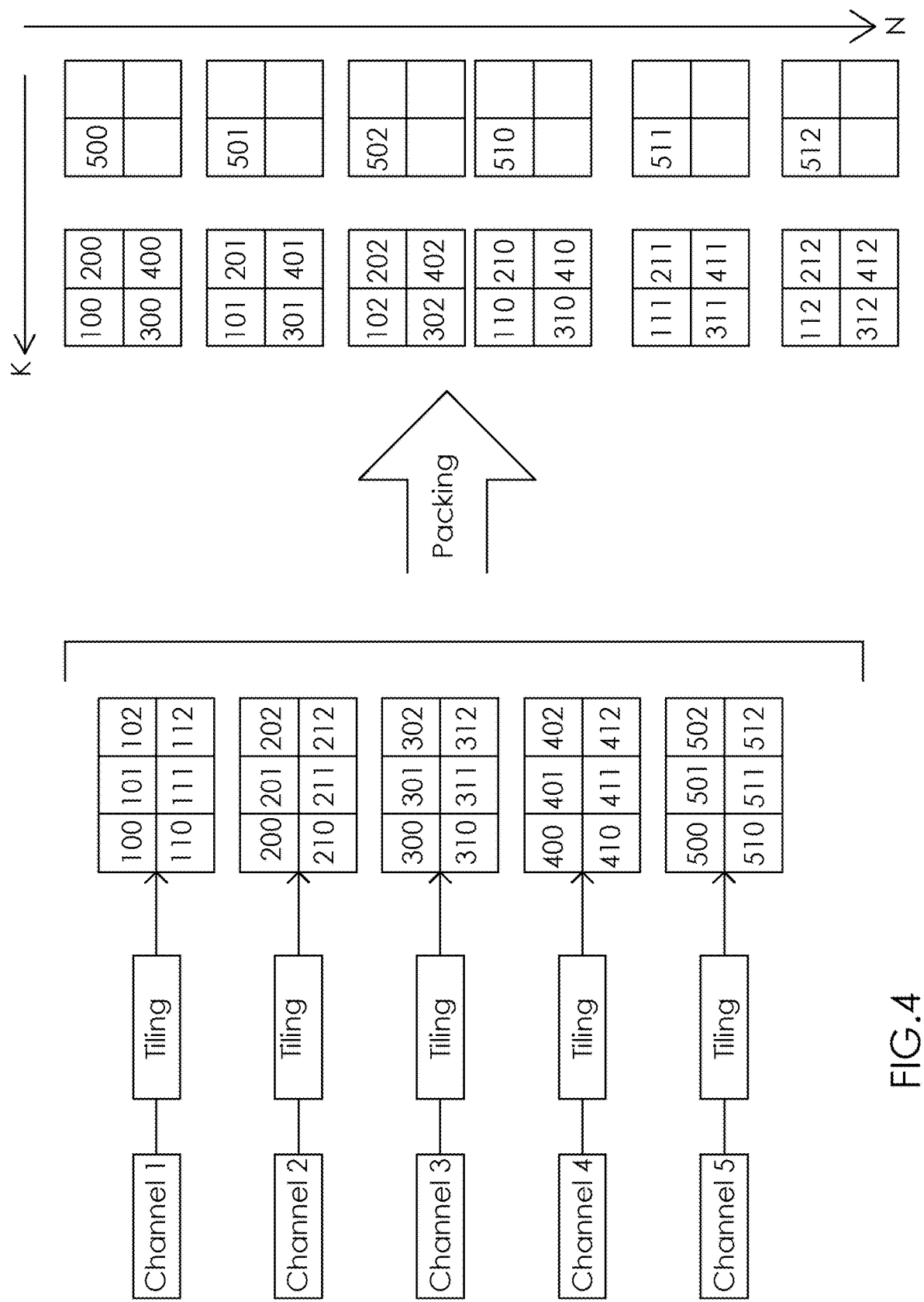
FIG. 4 is an illustration of the storing step for an example of an 8-bit data type image.

The step of storing multi-channel image in packs of 8-bit tiles, according to this invention, is precomputed in the central processing unit 3 of the server 1. This storing method is illustrated in FIG. 4 for a 8-bit data type image and in FIG. 5 for a 16-bit data type image.

The storing method comprises two steps: a tiling step and a packing step. According to FIG. 4, the tiling step is a process to split a given image channel into a regular grid of tiles of the same size. After the tiling step, each channel is a pack of several tiles, and each tile represents one part of the multi-channel image. For example, the tiles 100, 200, 300, 400, and 500 represents the same location in the multi-channel image. Each tile has the same size in pixels than a 2D texture unit i.e. 512×512 pixels.

The packing step consists in grouping each tile at a given location into packs of four channels. In the example of FIG. 4, the input image is composed of five channels. The top left tiles of each channel are packed into one pack (100, 200, 300 and 400) and another pack containing the tile 500. In this example, the number of packs is two. The number of packs is called K and the number of files is called N in FIG. 4.

The numbers of tiles, packs and files depend on the number of channels and on the size of the input image. The rule of the packing step is to minimize the number of tiles by grouping them into packs. A pack of four tiles is also called a 2D texture unit. In the example of FIG. 4, all the tiles are 8-bit data.

Figure 5:
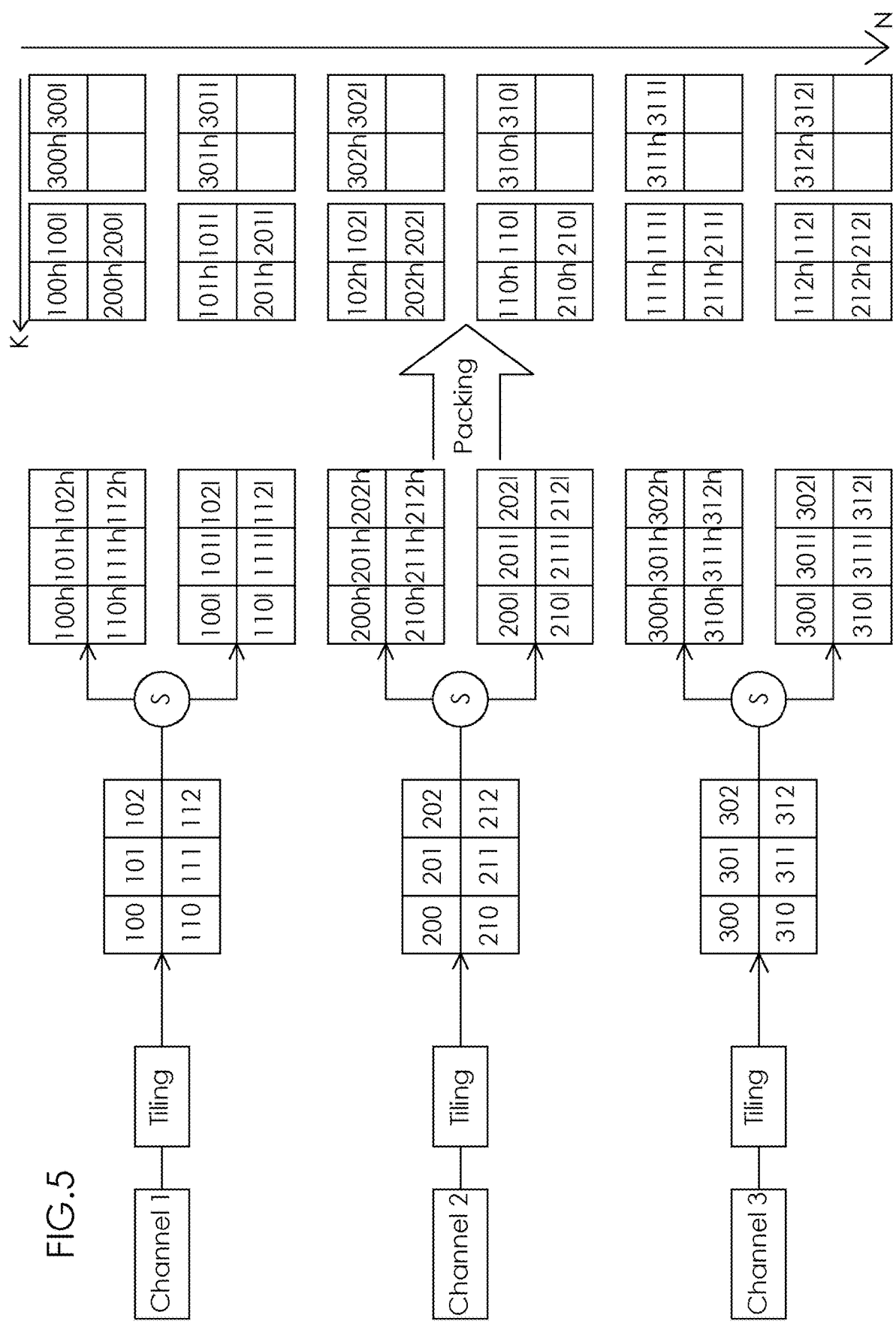
FIG. 5 is an illustration of the storing step for an example of a 16-bit data type image.

Now we refer to the storing step illustrated in FIG. 5 for an example of a 16-bit data type multi-channel image. It comprises the same steps as in the case of 8-bit data type image i.e. a tiling step and a packing step. Moreover it comprises a supplementary operation called S in FIG. 5. S is a splitting operation. It consists in separating the eight highest bits from the eight lowest bits in a 16-bit data type value. This operation is performed after the tiling step, wherein the obtained tiles are still 16-bit. For example, the top left 16- bit tile 100 is divided into two 8-bit tiles: 100h containing the eight highest bits for each pixel value and 100l containing the eight lowest bits for each pixel value.

Figure 6:
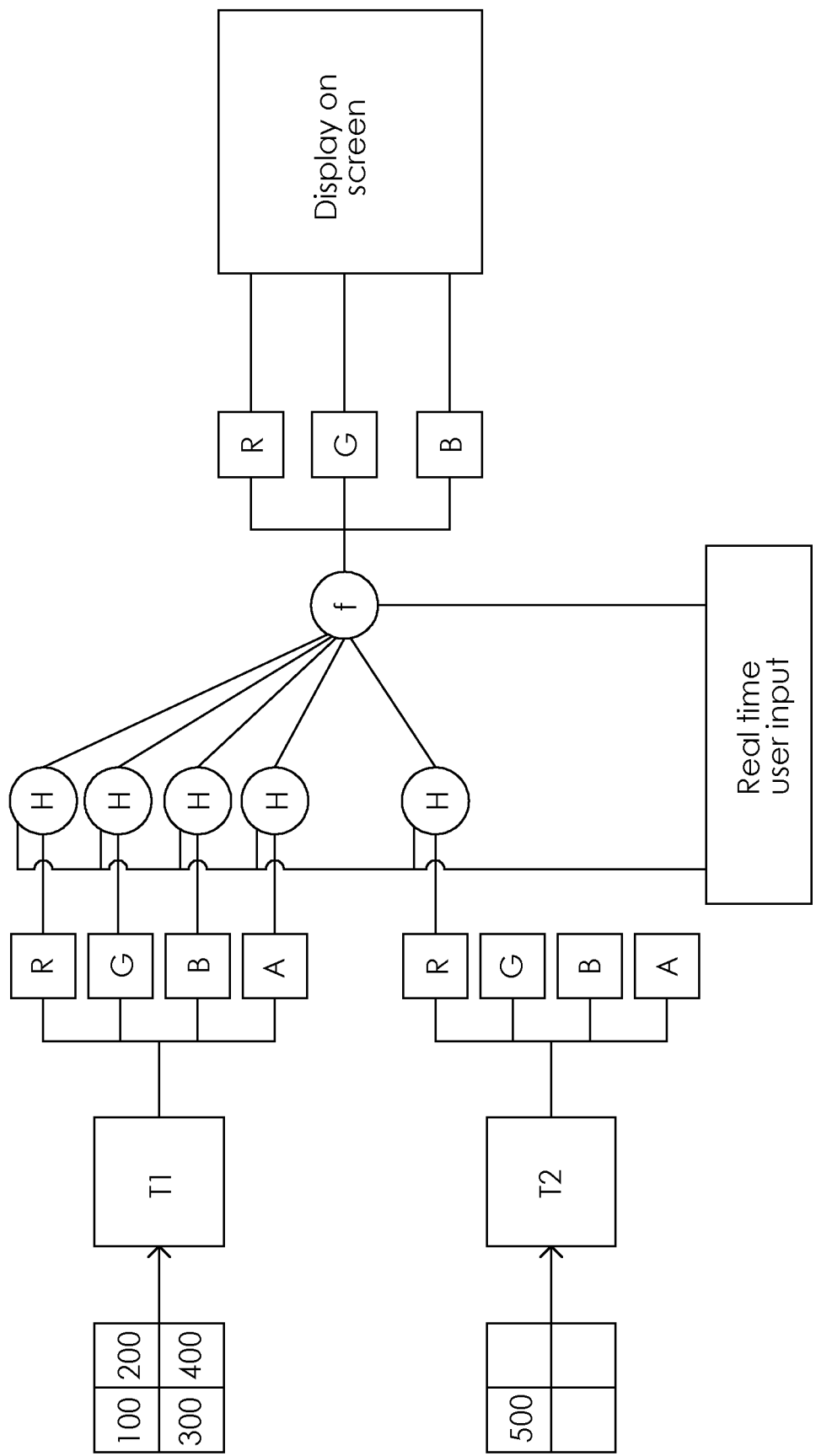
FIG. 6 represents a functional diagram of the transformation and projection to an RGB color space for an example of an 8-bit data type image.

FIG. 6 represents a functional diagram of the transformation and projection steps in the case of the same 8-bit data type image example as in FIG. 4. In particular, it shows the different steps performed in the first file of two 2D texture units. The same operations are performed in all the other 2D texture units showed in FIG. 4 but not represented here.

T1 and T2 are two 2D RGBA texture units. The transformation operation H is performed in all 2D texture units in parallel, i.e. all the pixels of the 2D texture units are computed at the same time. After the transformation step, the projection operation f is also performed in all pixels in parallel, allowing the image to be displayed in real time (i.e. in a time inferior to six milliseconds).

Figure 7:
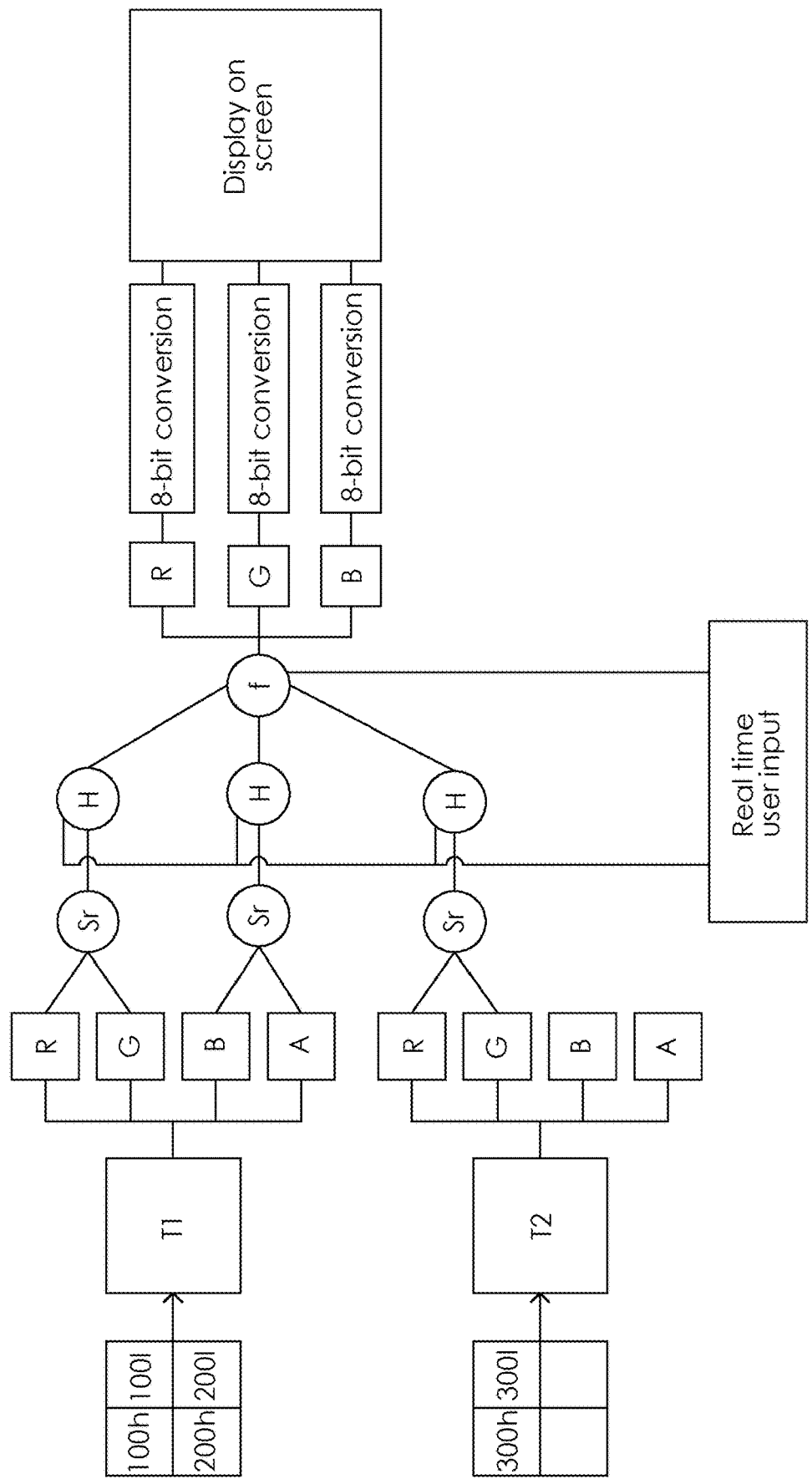
FIG. 7 represents a functional diagram of the transformation and projection to an RGB color space for an example of a 16-bit data type image.

Now we refer to FIG. 7 representing a functional diagram of the transformation and projection steps of the same 16-bit data type image example as in FIG. 5. In particular, it shows the different steps performed in the first file of two 2D texture units. The same operations are performed in all the other 2D texture units showed in FIG. 5 but not represented here.

In this diagram, there are two supplementary operations called Sr and 8-bit conversion. The Sr operation is the reverse function of the S operation illustrated in FIG. 5. Given two 8-bit values, the Sr function recomposes the 16-bit value. The 16-bit values of the pixels are transformed and projected into RGB color space directly before the on-screen 8-bit conversion. In the same way as for the 8-bit example, all the pixels are computed in parallel.

For comparison between sequential and parallel algorithms, we refer to the pseudo codes FIG. 8 and FIG. 9, respectively. They are written in case the transformation operation is a contrast adjustment. According to FIG. 9, the direct approach consists in sequential computing of the steps typically in a central processing unit. With this particular implementation, the pixels are processed sequentially. On user input changes made on the input transformation vector parameters ThLs and ThHs, the time to render an image on screen is way too large. As an example, the average time of performing three 8-bit channels is of two hundred to three hundred milliseconds. Therefore this direct approach prevents the real-time update of user input.

According to FIG. 9, the implementation method of the present invention uses graphics processing unit parallel computing capability to process all pixels p in parallel instead of sequentially. Another difference with sequential computing is in the input sources. In this method, the channels are stored in 2D texture units i.e. in packs of four tiles instead of system memory. The input channels refer to vector T of K 2D texture units. The example of FIG. 9 is for one file. The N files corresponding to the m selected channels are processed in parallel according to this implementation.

For an example according to the present invention, the average time of performing five 8-bit channels is comprised between two and six milliseconds. The high speed of this method allows the real-time update of user input.

The invention claimed is:

1. A method for viewing and manipulating a multi-channel image composed of several channels, whose channels originate from one or several imaging modalities, this method comprising the steps of:
   storing a multi-channel image in one or several 2D texture units, each representing a pack of four 8-bit tiles corresponding to one or several channels at a given location in the multi-channel image, each 2D texture unit being a fixed size memory storage unit in one graphics processing unit,
   taking a selection of one or several channels of the multichannel image into account,
   taking transformation and/or projection parameters for the selected channels into account,
   applying the transformation on the selected channels, according to received parameters, all pixels of the selected channels being transformed at the same time,
   projecting the selected channels into an RGB color space, according to the received parameters, all pixels of the selected channels being projected at the same time.

2. The method according to claim 1, wherein the transformation operation is a modification of the image's contrast.

3. The method according to claim 1, wherein the storing step, conducted for an 8-bit data type image, comprises the operations of:
   splitting each channel of the multi-channel image into a regular grid of 8-bit tiles of the same size, and of the same size as a 2D texture unit,
   grouping the 8-bit tiles corresponding to a given location in the regular grid into one or several 2D texture units.

4. The method according to claim 1, wherein the transformation step, conducted for an 8-bit data type image, comprises the operations of:
   attributing channel intensity values to pixels from the values stored in 2D texture units channels,
   computing new pixel values according to input transformation parameters.

5. The method according to claim 1, wherein the projecting step, conducted for an 8-bit data type image, comprises the operation of computing the linear projection of all pixels into an RGB color space, according to input projection parameters.

6. The method according to claim 1, wherein the storing step, conducted for a 16-bit data type image, comprises the operations of:
splitting each channel of the multi-channel image into a regular grid of 16-bit tiles of the same size, and of the same size as a 2D texture unit,
splitting each 16-bit tile into a couple of two 8-bit tiles by separating the eight highest bits from the eight lowest bits for each 16-bit pixel value,
grouping the 8-bit tiles corresponding to a given location in the regular grid into one or several 2D texture units.

7. The method according to claim 6, wherein the transformation step, conducted for a 16-bit data type image, comprises the operations of:
converting each consecutive couple of 8-bit 2D texture units channels into 16-bit values,
attributing channel intensity values to pixels from the 16-bit values,
computing new pixel values according to input transformation parameters.

8. The method according to claim 7, wherein the projecting step, conducted for a 16-bit data type image, comprises the operations of:
computing the linear projection of all pixels into an RGB color space using input projection parameters,
converting each obtained channels R, G and B into 8-bit channels.

* * * * *